May 21, 1957  J. MIDDELHOF  2,792,887
DEVICE FOR CUTTING STAPLE FIBER
Filed June 18, 1953

INVENTOR
Jan Middelhof
BY Albin F. Knight
ATTORNEY

May 21, 1957  J. MIDDELHOF  2,792,887
DEVICE FOR CUTTING STAPLE FIBER
Filed June 18, 1953
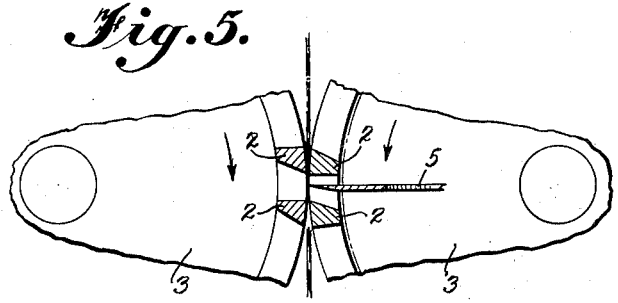
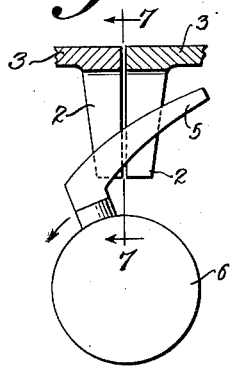
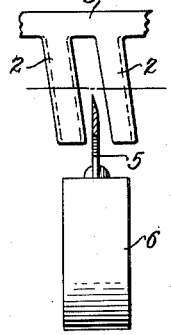
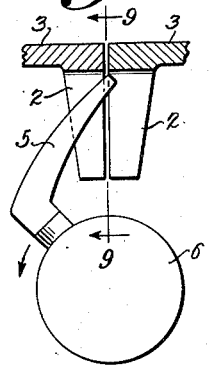
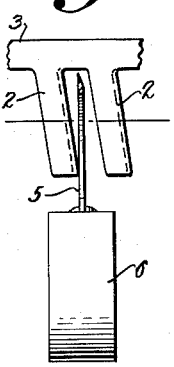
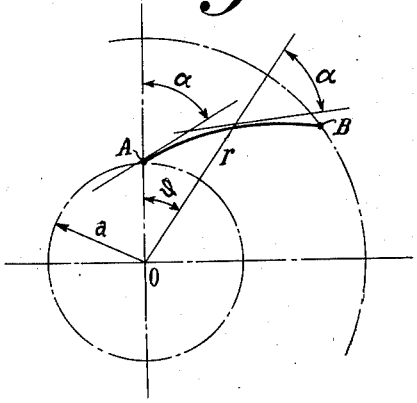
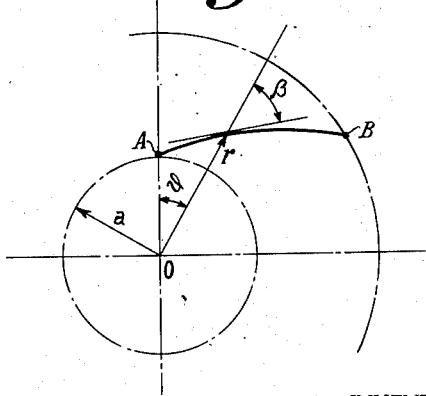
INVENTOR
Jan Middelhof
BY Albin F. Knight
ATTORNEY

United States Patent Office 2,792,887
Patented May 21, 1957

2,792,887

DEVICE FOR CUTTING STAPLE FIBER

Jan Middelhof, Arnhem, Netherlands, assignor to American Enka Corporation, Enka, N. C., a corporation of Delaware Application June 18, 1953, Serial No. 362,640

Claims priority, application Netherlands July 8, 1952

5 Claims. (Cl. 164—61)

The present invention relates to a device for cutting staple fiber, and more particularly to a device for cutting to a predetermined staple length a continuously fed bundle of threads by means of one or more rotating, flat, narrow, sword-shaped knives, whereby the bundle of threads is advanced by means of two touching, rotating cylinders, each formed by interspaced teeth, and wherein the knives move in a plane through, or almost through, the center line of the two cylinders, and through the gap between the touching teeth.

In the known devices of the above general type marketed by Gruschwitz Machinenfabrik K. G. (Saxony), and known under the name "Gru-Gru" machines, the knives have a straight edge, so that on passing through the gap formed between the teeth, which are perpendicular to the bases of the cylinders, they effect, as nearly as possible, at one place a sudden cutting of the bundle of threads. Cutting is thus brought about, as it were, by cleaving. With a thick bundle of threads, and especially with a bundle of threads consisting of exceptionally strong material such as polyamide threads, difficulties often arise, as the cutting is not sufficiently regular. These difficulties, and in particular those encountered in cutting to staple fiber lengths such strong and tough materials as nylon, have led to the need for improvements in the presently existing machines.

It is therefore an object of the present invention to provide a novel and efficient device for accurately cutting a continuously fed bundle of threads into predetermined staple fiber lengths, and particularly in the case of threads of strong and tough materials such as nylon and the like. Other objects and advantages of the invention will become apparent as the description proceeds.

According to this invention, it has been found possible to construct a device in which no difficulties are encountered even when cutting bundles of fully synthetic threads such as nylon threads and the like.

The device according to the invention is characterized in that the cutting edge of each knife is ground to the shape of a logarithmic spiral or at least approximately that shape, the origin or pole of the spiral lying in or near the axis of rotation of the knife-head, and in that the tooth planes bounding the gaps between the teeth are disposed at an angle with respect to the cylinder bases that deviates from 90°.

If the cutting edges of the knives have exactly the shape of a logarithmic spiral in a plane perpendicular to the rotation axis of the cutting head in which the knives are mounted and with its origin or pole in this axis, then the cutting angle, i. e. the angle between the bundle of threads and the cutting edge at the point of contact with the bundle, is constant for all positions of the knife.

In the known devices of this general character this angle is very small, and therefore cutting is almost exclusively brought about by cleaving.

It has been shown according to the present invention that it is extremely advantageous to have knife edges so approximating the shape of a logarithmic spiral that at any point the cutting angle is at least 40°, and, preferably, about 60°.

If desired, a simple construction of the knives may be obtained by forming the approximation of the logarithmic spiral by a combination of two or more circular arcs.

If the cutting edges of the knives have the exact form of a logarithmic spiral, then the point of intersection during cutting of the whole bundle, when the oblique teeth are used, does not always lie in te exact center between two teeth. This is no objection in itself. The only consequence is that the cut-out fiber package has not exactly the form of a parallelogram, but rather that of a surface bounded by two parallel straight lines and two parallel curved lines.

For obtaining a cut-out bunch of fibers in the form of a true parallelogram, it has been found further according to the present invention that the approximation of the logarithmic spiral, which determines the shape of the knife edges, should consist of a length of a spiral of Archimedes.

By way of further illustration of the present invention, it is described below in conjunction with the accompanying drawings which are to be regarded as illustrative rather than by way of limitation. In the drawings:

Figures 4 and 5 show sections through the lines IV—IV and V—V, respectively, of Figure 3;

Figure 6 indicates the moment the knife has passed about halfway through the gap between the teeth;

Figure 7 is a section through the line VII—VII of Figure 6;

Figure 8 indicates the moment the cutting of the bundle of threads has been nearly completed;

Figure 9 shows a section through the line IX—IX of Figure 8;

Figure 10 shows the curve of a logarithmic spiral as an example of one embodiment of the cutting edge of the knives; and Figure 11 shows the curve of a spiral of Archimedes as an example of another embodiment of the cutting edge.

Figure 1:
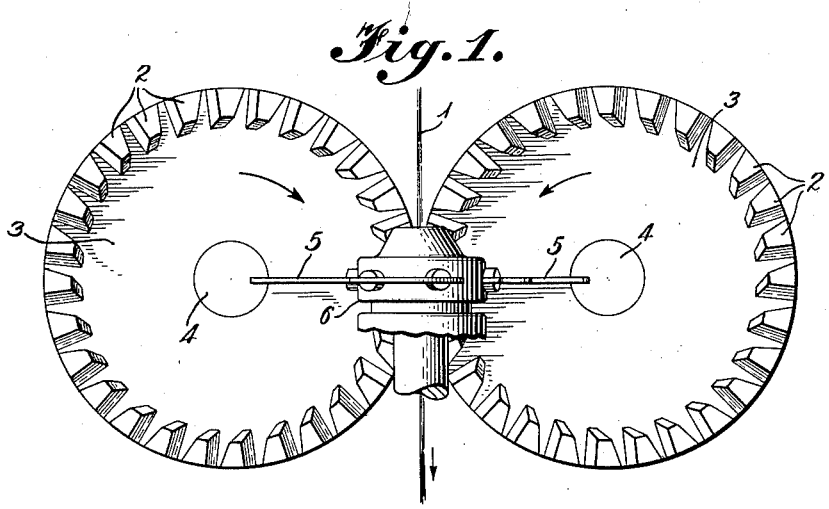
Figure 1 shows a front view of the device according to the invention, showing only the most essential parts.

Referring now more particularly to the several figures, the teeth forming the cylinders for advancing the bundle 1 of threads to be cut are indicated by 2. The teeth 2 are fixed on or are a part of a plate 3, which forms the base of the cylinder constituted by the teeth 2. Each of the plates 3 is rotated in the direction of the arrows shown in Figure 1 by means of a shaft 4. The knives 5, suitably mounted in a cutting-head 6, are provided for cutting the thread bundle 1.

From Figure 5 is will be observed how the teeth 2 clamp and advance the bundle of threads 1 as the tooth cylinders rotate.

Figure 2:
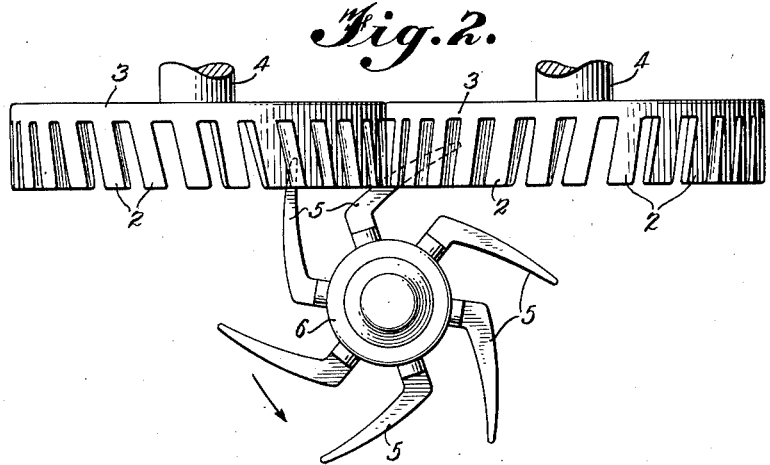
Figure 2 shows a top view of the device as shown in Figure 1.

On the knife-head 6 are six knives 5 (Figure 2). The relative speeds of rotation of the cylinders formed by the teeth 2 and of the cutting-head 6 are such that a knife 5 passes through the gap or slot between two teeth of one cylinder and two teeth of the other, each time these pairs of teeth are in contact with each other. (Figure 5.)

By means of the knives rotating in the direction of the arrow in Figures 2, 3, 6 and 8, the bundle of threads 1 is cut at an angle α (Figure 10). This cutting angle α is constant or substantially constant for any position of the knife, owing to the particular shape of the cutting edge.

Figure 3:
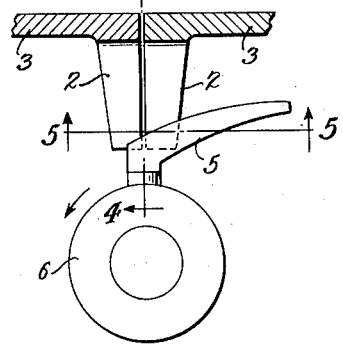
Figure 3 shows, in top view, a knife the moment it has passed only a short distance through the gap between the teeth.
Figure 4:
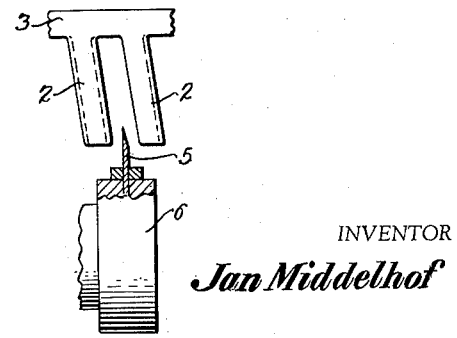

In the position given in Figure 3, the point of intersection of the bundle 1 and the knife 5 is near the end of the teeth. The intersection is also very near the center between the teeth (Figure 5). On further rotation of the cylinders, the knife 5 passes deeper through the gap between the teeth, although still substantially centered between them. This is clearly indicated in Figures 3 to 9. Cutting of the thread bundle is therefore effected in a gradual, not in a momentary way, i. e., with slicing rather than merely cleaving. In Figure 6, the knife has moved so far into the slot or gap between the teeth that about the middle of the fiber bundle is cut. Figure 7 shows how the cutting edge of the knife is then still in the center between the teeth. In Figures 8 and 9 it is shown how the last part of the bundle of threads is cut. As a result of the particular form of the knife and the position of the teeth on the surface of the cylinder formed by them, the device according to this invention insures that the knife will pass unhindered between the moving teeth, and that at any given moment, of which in Figures 3-9 only three positions are indicated, the fibers (which are being cut at an angle $\alpha$) will be tightly clamped between the teeth, with the point of cutting located about in the center between the points of clamping.

By the use of the device according to the present invention, bunches are cut from the bundle of threads of which all fibers are completely equal in length. These bunches have the form of a parallelogram, contrary to the known cutting devices which yield bunches of rectangular shape.

In respect of the shape of the knife edge employed in the device according to this invention, two embodiments are shown in Figures 10 and 11, given by way of illustration. Figure 10 shows part of a logarithmic spiral, and Figure 11 part of a spiral of Archimedes.

The formula for the logarithmic spiral in Figure 10 is $r=a.e^{m\theta}$, where $a=$ the value of $r$ for $\theta=0$, $e=2.71828$ and $m=$ cotg. $\alpha$ (length of the cutting edge, as in Figure 10, $=AB$).

The formula for the spiral of Archimedes in Figure 11 is $r=a+C\theta$, where $a=$ the value of $r$ for $\theta=0$, and $C$ is chosen so that between A and B the angle $\beta$ is nearly constant and about equal to the angle $\alpha$ in the logarithmic spiral of Figure 10.

The device according to the invention guarantees a completely regular cutting, and it has been found that as a result of the fact that the cutting is done at an angle of cutting, i. e., slicing rather than mere cleaving, even very strong fibers are faultlessly cut to length. The number of fibers of deviating length, which heretofore has always offered great difficulties in cutting with the known devices, especially when cutting strong fibers such as those of polyamide threads, is about zero with the device according to this invention. In addition, it has been found that the life of the knives of the device according to the present invention is considerably longer than that of the known devices.

It will be apparent that this invention is not limited to the details of the particular device described above. Dependent on the number of teeth of the cylinder, and on the length of the fibers to be obtained, the cutting-head may be provided with more or less knives than the six indicated above.

It may be stated that for an entirely precise operation a slightly curved shape of the teeth would be necessary, together with a true form of a logarithmic spiral for the knife edges. It has been found in practice, however, that ideal conditions are sufficiently approximated by making the sides of the teeth bounding the gaps straight, and that a deviation of some few degrees of the angle of cutting at various places of the knife has no adverse effect from a practical point of view. Consequently, and as was indicated above, the theoretically ideal cutting edge of the knife may be approximated by forming this edge from two or more circular parts that tangentially merge into each other. The whole of the cutting edge then is a sufficient approximation to a portion of a logarithmic spiral.

While specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. An apparatus for cutting into staple lengths a continuous bundle of fibrous material comprising a pair of cooperating feed cylinders adapted for rotation about spaced parallel axes in order to propel the material longitudinally through the apparatus, a plurality of teeth cut in the peripheral surface of each of said cylinders, the teeth of one cylinder cooperating with respective teeth of the other cylinder whereby the material will be gripped therebetween and fed thereby, said plurality of teeth defining an equal number of slots which are inclined with respect to the axes of said cylinders and peripherally spaced a multiple of the desired staple length, a knife-head adapted for rotation about an axis perpendicular to the axes of said cylinders and parallel to but spaced from the path of travel of said material, a plurality of sword-shaped knives carried by said knife-head, said knives having cutting edges at least approximately the shape of a logarithmic spiral the origin of which lies at the axis of rotation of said knife-head and means for driving said feed cylinders and said knife-head at such speeds relative one to the other that each knife passes through at least one of the slots defined by cooperating pairs of said teeth thereby to cut into staple lengths the bundle of fibrous material gripped between said teeth, the cutting of the material being effected in a gradual manner characterized predominantly by slicing rather than by cleaving.

2. Apparatus as in claim 1 in which the cutting edge of each of the knives is in substantially the shape of a logarithmic spiral having such a configuration that at any point along the length of the cutting edge the cutting angle is at least 40°.

3. Apparatus as in claim 1 in which the cutting edge of each of the knives is in substantially the shape of a logarithmic spiral having such a configuration that at any point along the length of the cutting edge the cutting angle is approximately 60°.

4. Apparatus as defined in claim 1 in which the shape of the cutting edge of each of the knives is approximately that of a spiral of Archimedes.

5. Apparatus as defined in claim 4 in which the configuration of the spiral of Archimedes is such that at any point along the length of the cutting edge the cutting angle is at least 40°.

References Cited in the file of this patent

UNITED STATES PATENTS

| | | |
|---|---|---|
| 223,103 | Berstler | Dec. 30, 1879 |
| 554,708 | Montgomery | Feb. 18, 1896 |
| 745,965 | Lyon | Dec. 1, 1903 |
| 1,195,569 | Fabian | Aug. 22, 1916 |
| 1,407,151 | Halcumb | Feb. 21, 1922 |
| 1,449,021 | Turner | Mar. 20, 1923 |
| 1,695,688 | Hoopes | Dec. 18, 1928 |
| 2,184,452 | Grunert | Dec. 26, 1939 |